United States Patent
Li et al.

(10) Patent No.: US 8,731,091 B2
(45) Date of Patent: May 20, 2014

(54) METHOD AND APPARATUS FOR DETERMINING A PRECODING MATRIX

(75) Inventors: Jianjun Li, Seongnam-si (KR); Jae Hyeon Ahn, Seoul (KR); Zhengzi Li, Seongnam-si (KR); Hyung Joon Jeon, Seongnam-si (KR)

(73) Assignee: Intellectual Discovery Co., Ltd., Seoul (KR)

( * ) Notice: Subject to any disclaimer, the term of this patent is extended or adjusted under 35 U.S.C. 154(b) by 176 days.

(21) Appl. No.: 13/318,145

(22) PCT Filed: Apr. 30, 2010

(86) PCT No.: PCT/KR2010/002744
§ 371 (c)(1),
(2), (4) Date: Oct. 30, 2011

(87) PCT Pub. No.: WO2010/126328
PCT Pub. Date: Nov. 4, 2010

(65) Prior Publication Data
US 2012/0045019 A1     Feb. 23, 2012

(30) Foreign Application Priority Data
Apr. 30, 2009    (KR) ................... 10-2009-0038484

(51) Int. Cl.
*H04B 7/02*    (2006.01)
*H04L 1/02*    (2006.01)

(52) U.S. Cl.
USPC ............................. 375/267; 375/259; 375/260

(58) Field of Classification Search
USPC .......................................................... 375/267
See application file for complete search history.

(56) References Cited

U.S. PATENT DOCUMENTS

2009/0034639 A1    2/2009    Hwang et al.
2010/0061477 A1    3/2010    Lee et al.

FOREIGN PATENT DOCUMENTS

| KR | 1020070049050 A | 5/2007 |
| KR | 1020080070151 A | 7/2008 |
| WO | 2008-023646 A1 | 2/2008 |

*Primary Examiner* — Erin File (57) ABSTRACT

Disclosed is a method for determining precoding matrix based on an open-loop MIMO scheme, which can enhance a diversity gain at a static communication environment or a low-mobility communication environment. The method for determining precoding matrix applies a first precoding matrix to downstream data to transmit the downstream data through a plurality of antennas, the first precoding matrix being selected from a codebook which comprises a plurality of precoding matrixes, and changes the first precoding matrix to a second precoding matrix per predetermined period, and applying the second precoding matrix to the downstream data to transmit the downstream data through the antennas. The second precoding matrix is a precoding matrix corresponding to an index which has been shifted by a certain value from an index of the first precoding matrix in a direction where an index of a precoding matrix increases, in the codebook.

22 Claims, 5 Drawing Sheets

METHOD AND APPARATUS FOR DETERMINING A PRECODING MATRIX

TECHNICAL FIELD

The present invention relates to a wireless communication system, and more particularly, to determination of a precoding matrix in a wireless communication system.

BACKGROUND ART

The Institute of Electrical and Electronics Engineers (IEEE) 802 Committee is planning to develop technical standard for IEEE 802.16m, being technical standard that has been further advanced by one level than the current standard of mobile WiMAX, as the next generation standard of WiBro/mobile WiMAX. IEEE 802.16m has a transmission rate of 100 Mbps as a target upon moving, and has a transmission rate of 1 Gbps as a target upon fixing.

The wireless communication system based on IEEE 802.16m is using the Multi-Input Multi-Out (MIMO) scheme where a transmitting end including a plurality of antennas transmits different data through the respective antennas, for the enhancement in efficiency of data transmission. With the use of the MIMO scheme, a wireless communication system obtains a diversity gain and increases a data transmission rate.

In applying the MIMO scheme, transmission data is coded with a precoding matrix to transmit for enhancing the reliability of data transmission. IEEE 802.16m has proposed a method that selects a precoding matrix from a codebook on the basis of a subcarrier identifier (ID) in frequency domain, for determining a precoding matrix in the open-loop MIMO scheme.

However, since Channel State Information (CSI) is not fed back from a receiving end for selecting a precoding matrix unlike in the closed-loop MIMO scheme, the open-loop MIMO scheme cannot guarantee the performance enhancement of the wireless communication system when determining a precoding matrix according to the above-described method.

Moreover, in the open-loop MIMO scheme, when determining a precoding matrix according to the above-described method, a diversity gain is not obtained at a low-mobility communication environment because the precoding matrix is not changed for entire time, and consequently, the optimal precoding matrix cannot be determined.

DISCLOSURE

Technical Problem

Accordingly, the present invention is directed to provide a method and apparatus for determining precoding matrix that substantially obviate one or more problems due to limitations and disadvantages of the related art.

An aspect of the present invention is to provide the method and apparatus for determining precoding matrix, which can enhance a diversity gain at a communication environment.

Another aspect of the present invention is to provide the method and apparatus for determining precoding matrix, which can enhance a diversity gain at a static communication environment or a low-mobility communication environment.

Another aspect of the present invention is to provide the method and apparatus for determining precoding matrix, which can enhance a Hybrid Automatic ReQuest (HARQ) gain when retransmitting a stream with an HARQ scheme.

Additional advantages and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

Technical Solution

To achieve these and other advantages and in accordance with the purpose of the invention, as embodied and broadly described herein, there is provided a method for determining precoding matrix, which is based on an open-loop Multi-Input Multi-Out (MIMO) scheme, including: applying a first precoding matrix to downstream data to transmit the downstream data through a plurality of antennas, the first precoding matrix being selected from a codebook which includes a plurality of precoding matrixes; and changing the first precoding matrix to a second precoding matrix per predetermined period, and applying the second precoding matrix to the downstream data to transmit the downstream data through the antennas, wherein the second precoding matrix is a precoding matrix corresponding to an index which has been shifted by a certain value from an index of the first precoding matrix in a direction where an index of a precoding matrix increases, in the codebook.

In another aspect of the present invention, there is provided a method for determining precoding matrix, which is based on an open-loop MIMO scheme, including: calculating an index of a precoding matrix to be applied to a subcarrier, with an identifier (ID) of the subcarrier and an ID of a current frame which includes the subcarrier and is to be transmitted; and determining a precoding matrix corresponding to the calculated index as a precoding matrix to be applied to the subcarrier, in a codebook including a plurality of precoding matrixes.

In another aspect of the present invention, there is provided a method for determining precoding matrix including: selecting one precoding matrix from a codebook which includes $N_W$ number of precoding matrixes defined as Nt×Mt, on the basis of an index 'K' of a subcarrier and an index 'M' of a frame; and coding downstream data of the subcarrier into the selected precoding matrix to transmit the coded precoding matrix through a plurality of transmission antennas, wherein Nt is the number of transmission antennas, and Mt is the number of transmission streams.

In another aspect of the present invention, there is provided an apparatus for determining precoding matrix, which is based on an open-loop MIMO scheme, including: a precoder applying a first precoding matrix to downstream data and changing the first precoding matrix to a second precoding matrix to apply the second precoding matrix to the downstream data per predetermined period, the first precoding matrix being selected from a codebook which includes a plurality of precoding matrixes; and a transmitter transmitting precoded downstream data, outputted from the precoder, through a plurality of antennas, wherein the second precoding matrix is a precoding matrix corresponding to an index which has been shifted by a certain value from an index of the first precoding matrix in a direction where an index of a precoding matrix increases, in the codebook.

In another aspect of the present invention, there is provided an apparatus for determining precoding matrix, which is based on an open-loop MIMO scheme, including: a precoder calculating an index of a precoding matrix to be applied to a subcarrier with an ID of the subcarrier and an ID of a current frame, and determining a precoding matrix, corresponding to the calculated index, in a codebook including a plurality of precoding matrixes to apply the determined precoding matrix to the subcarrier; and a transmitter transmitting a frame, including a subcarrier with the precoding matrix applied thereto, through a plurality of antennas.

It is to be understood that both the foregoing general description and the following detailed description of the present invention are exemplary and explanatory and are intended to provide further explanation of the invention as claimed.

Advantageous Effects

According to the embodiments of the present invention, a diversity gain can be enhanced at a communication environment.

Moreover, by changing a precoding matrix to be applied to each subcarrier per predetermined frame period, the diversity gain can be enhanced even at the static communication environment or the low-mobility communication environment.

Furthermore, when retransmitting each stream with the HARQ scheme, by changing a precoding matrix to be applied to a corresponding stream according to the HARQ retransmission period, the number of retransmissions can be reduced, and thus the HARQ gain can be enhanced.

DESCRIPTION OF DRAWINGS

The accompanying drawings, which are included to provide a further understanding of the invention and are incorporated in and constitute a part of this application, illustrate embodiment(s) of the invention and together with the description serve to explain the principle of the invention. In the drawings.

MODE FOR INVENTION

Reference will now be made in detail to the exemplary embodiments of the present invention, examples of which are illustrated in the accompanying drawings. Wherever possible, the same reference numbers will be used throughout the drawings to refer to the same or like parts.

Hereinafter, a method and apparatus for determining precoding matrix method according to embodiments of the present invention will be described in detail with reference to the accompanying drawings.

Figure 1:
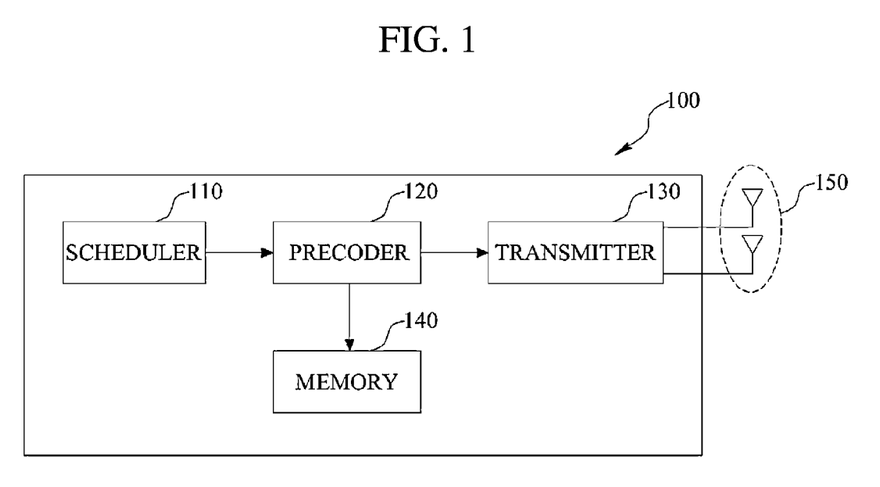
FIG. 1 is a block diagram schematically illustrating an apparatus for determining precoding matrix according to an embodiment of the present invention.

FIG. 1 is a block diagram schematically illustrating a precoding matrix determining apparatus according to an embodiment of the present invention. A precoding matrix determining apparatus 100 of FIG. 1 may be included in a transmitting end such as a base station. In an embodiment, the transmitting end uses an open-loop MIMO scheme that can determine a precoding matrix without feedback from a receiving end such as a terminal.

Referring to FIG. 1, the precoding matrix determining apparatus 100 includes a scheduler 110, a precoder 120, a transmitter 130, and a memory 140.

The scheduler 110 performs a scheduling operation for transmitting data received from an upper layer. Specifically, the scheduler 100 determines the Modulation and Coding Scheme (MCS) level of data to be transmitted to each terminal, and allocates a plurality of bursts for data to be transmitted to respective terminals. Also, the scheduler 110 generates a map message indicating the allocation of corresponding bursts, and thereafter supplies scheduled downstream data to the precoder 120.

The precoder 120 selects a precoding matrix from a codebook stored in the memory 140. Subsequently, the precoder 120 precodes the downstream data supplied from the scheduler 110 by applying the selected precoding matrix to the downstream data.

In an embodiment, a precoding matrix 'W(k)' may be defined as "Nt×Mt". Herein, Nt indicates the number of transmission antennas, Mt indicates the number of transmission streams, and k denotes a physical index of a subcarrier to which the precoding matrix 'W(k)' is to be applied. In this case, the precoding matrix 'W(k)' may be selected from a subset codebook that are configured with $N_W$ number of precoding matrixes.

The precoder 120 may change a precoding matrix to be applied to the downstream data per predetermined period to allow downstream data (which will be transmitted to the receiving end at a low-mobility communication environment) to undergo another channel environment, and thereby enhancing a diversity gain.

In an embodiment, the precoder 120 may select a first precoding matrix from among a plurality of precoding matrixes included in the codebook, and apply the selected precoding matrix to downstream data. The precoder 120 may apply a second precoding matrix, corresponding to an index that is obtained by shifting an index of the first precoding matrix by a certain value in the codebook per predetermined period, to the downstream data.

Herein, the first precoding matrix may be determined as a precoding matrix to be applied to a subcarrier including the downstream data. In this case, the precoding matrix to be applied to the subcarrier including the downstream data may be determined using an ID of a corresponding subcarrier, the number of subcarriers that configure a subband including the corresponding subcarrier, and the number of precoding matrixes included in the codebook.

Specifically, by using Equation (1) below, the precoder 120 determines an index of the precoding matrix to be applied to the subcarrier including the downstream data, and determines a precoding matrix, corresponding to the determined index among the precoding matrixes included in the codebook, as the first precoding matrix to be applied to the downstream data.

$$i = \mod(\lceil k/(N_1 P_{SC}) \rceil - 1, N_W) + 1 \qquad (1)$$

where i denotes the index of the precoding matrix to be applied to the subcarrier including the downstream data, k denotes the ID of the subcarrier including the downstream data, and $N_1 P_{SC}$ denotes the number of subcarriers that configure a subband including a corresponding subcarrier.

Herein, the subband is configured with a plurality of resource blocks that are successive in a subcarrier axis direction. In an embodiment, the subband may be configured with four resource blocks, and one resource block may be configured with eighteen subcarriers and six symbols. In this case, $N_1$ may be four that are the number of resource blocks configuring the subband, and Psc may be eighteen that are the number of subcarriers configuring one resource block.

In Equation (1), $N_W$ denotes the number of precoding matrixes included in the codebook. In an embodiment, $N_W$ may be the same value as the number of subbands. In this case, the precoding matrix determined by the precoder 120 is changed per $N_1P_{SC}$ that indicates the number of subcarriers included in the subband.

Equation (1), a sign "⌈ ⌉" denotes the smallest integer value among a plurality of integer values greater than a number in a corresponding sign, and mod(a,b) denotes performing of a modular arithmetic operation on "a and b".

A method that calculates the index of the precoding matrix to be applied to the subcarrier including the downstream data with Equation (1) will be described below as an example. Hereinafter, the number of subcarriers configuring one subband is assumed as 72, and the number of precoding matrixes included in the codebook is assumed as 10.

First, when downstream data is included in a subcarrier corresponding to an ID '0', since a value of a sign "⌈ ⌉" with "$k/N_1P_{SC}$" expressed therein is 0, −1 is obtained by subtracting 1 from 0. Also, 9 is obtained by performing a modular arithmetic operation on −1 and 10 that is a value of $N_W$, and thus, 10 is obtained by summing 1 and 9. Accordingly, an index of a precoding matrix to be applied to a corresponding subcarrier is 10.

As another example, when downstream data is included in a subcarrier corresponding to an ID '72', since a value of a sign "⌈ ⌉" with "$k/N_1P_{SC}$" expressed therein is 1, 0 is obtained by subtracting 1 from 1. Also, 0 is obtained by performing a modular arithmetic operation on 0 and 10 that is a value of $N_W$, and thus, 10 is obtained by summing 1 and 0. Accordingly, an index of a precoding matrix to be applied to a corresponding subcarrier is 1.

The precoder 120 determines an index of a precoding matrix in the above-described method, and determines a precoding matrix, corresponding to the determined index among the precoding matrixes included in the codebook, as the first precoding matrix to be applied to the downstream data.

Figure 2:
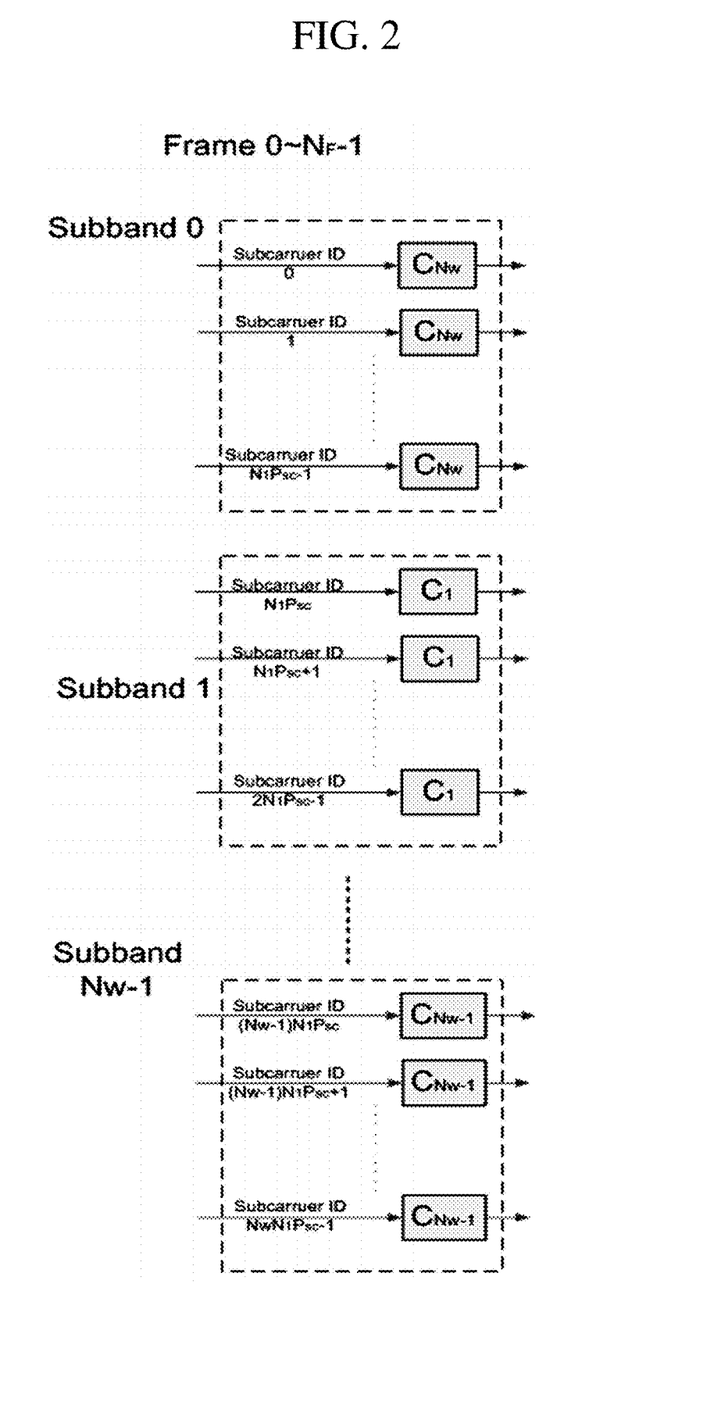
FIGS. 2 and 3 are diagrams illustrating a schematized method for determining a precoding matrix, according to an embodiment of the present invention.

When a precoding matrix to be applied to each subcarrier is determined by the above-described method, as illustrated in FIG. 2, the same precoding matrix is applied to subcarriers configuring the one subband.

Subsequently, when a predetermined period arrives, the precoder 120 determines the second precoding matrix, corresponding to an index that is obtained by shifting the index of the first precoding matrix by a certain value in the codebook, as a precoding matrix to be applied to the downstream data.

Figure 3:
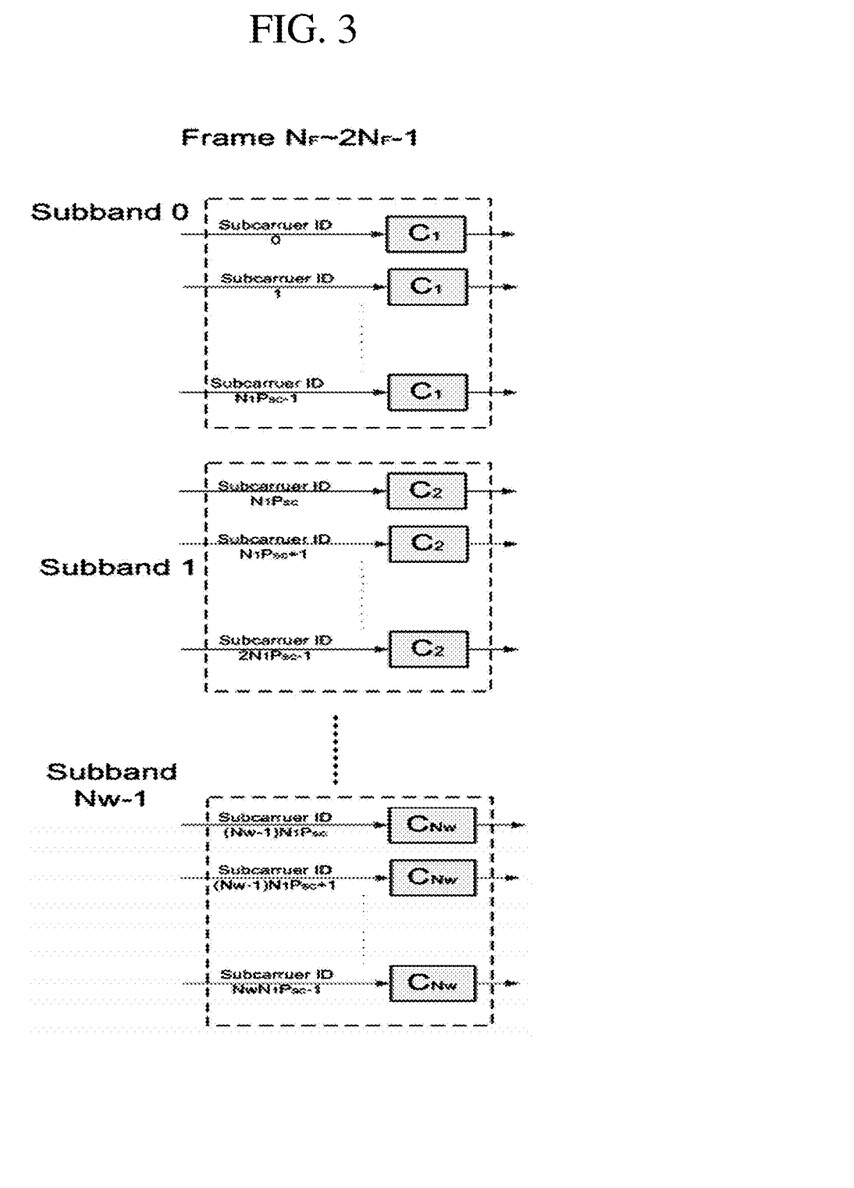

That is, as described above, the precoder 120 changes a precoding matrix to be applied to the downstream data when the predetermined period arrives. In an embodiment, the certain value may be set as 1. An example of FIG. 3 is obtained by shifting the index of the first precoding matrix in FIG. 2 by one.

For example, when the first precoding matrix is a precoding matrix corresponding to an index '1', the second precoding matrix is determined as a precoding matrix corresponding to an index '2' that is obtained by shifting the index '1' of the first precoding matrix by one, in the codebook. Also, when the first precoding matrix is a precoding matrix corresponding to an index '$N_W$−1', the second precoding matrix is determined as a precoding matrix corresponding to an index '$N_W$' that is obtained by shifting the index '$N_W$−1' of the first precoding matrix by one, in the codebook.

In the above-described embodiment, the precoder 120 may determine a period for changing a precoding matrix to be applied to downstream data, with time correlation between spatial channels.

Specifically, when time correlation between spatial channels is determined as high, this denotes a low-mobility communication environment, and thus, the precoder 120 may set a short change period of a precoding matrix to be applied to downstream data. Also, when time correlation between spatial channels is determined as low, this denotes a high-mobility communication environment, and thus, the precoder 120 may set a long change period of a precoding matrix to be applied to downstream data.

That is, the precoder 110 may set a change period of a precoding matrix to be applied to downstream data so as to be inversely proportional to time correlation between spatial channels.

In this case, the precoder 120 may precalculate a change period of a precoding matrix based on time correlation between spatial channels, and stores the calculated change period in a table type. When time correlation between spatial channels is calculated, the precoder 120 may set a change period, which is matched with the time correlation between spatial channels in the table, as a change period of a precoding matrix to be applied to downstream data.

When a wireless communication system supports HARQ-based retransmission, the precoder 120 determines a change period of a precoding matrix to be applied to downstream data as an HARQ retransmission period, thereby enhancing an HARQ gain.

In the above-described embodiment, it has been described above that the precoder 120 determines the first precoding matrix from among the plurality of precoding matrixes included in the codebook, and thereafter determines the second precoding matrix to be applied to the downstream data by shifting the index of the first precoding matrix by a certain value per a predetermined period, in the codebook.

In a modified embodiment, the precoder 120 may determine a precoding matrix to be applied to a corresponding subcarrier in consideration of an ID of a current frame including the corresponding subcarrier and thus allow the precoding matrix, which will be applied to the corresponding subcarrier, to be changed per a predetermined period.

Particularly, the precoder 120 calculates an index of a precoding matrix to be applied to a corresponding subcarrier with an ID of a subcarrier including downstream data and an ID of the current frame. The precoder 120 may calculate the index of the precoding matrix to be applied to the corresponding subcarrier with Equation (2) below.

$$i = \text{mod}(\lceil k/(N_1P_{SC})\rceil + \lceil m/N_F \rceil - 1, N_W) + 1 \qquad (2)$$

where i denotes an index of a precoding matrix to be applied to a subcarrier including downstream data, k denotes an ID of the subcarrier including the downstream data, and $N_1P_{SC}$ denotes the number of subcarriers that configure a subband including a corresponding subcarrier. Also, m denotes an ID of the current frame, $N_F$ denotes the change period of the precoding matrix to be applied to the corresponding subcarrier, and $N_W$ denotes the number of precoding matrixes included in the codebook.

In this embodiment, by determining a precoding matrix in consideration of both an index of a subcarrier and a frame including a corresponding subcarrier, a precoding matrix to be applied to a subcarrier K included in an Mth frame may be changed per a predetermined frame period (NF frame). That is, a precoding matrix to be applied to a corresponding subcarrier is changed by cyclically shifting an index of the precoding matrix by a certain value (for example, 1) after an $N_F$ frame.

A method, as an example, will be described where the precoder 120 calculates an index of a precoding matrix to be applied to a subcarrier including downstream data with Equation (2). Hereinafter, the number of subcarriers included in one subband is assumed as 72, the number of precoding matrixes included in the codebook is assumed as 10, and a change period 'NF' of a precoding matrix is assumed as 10.

First, when downstream data is included in a subcarrier corresponding to an ID '0' and an ID of a current frame is 0, since a value of a sign "⌈ ⌉" with "$k/N_1P_{SC}$" expressed therein is 0 and a value of a sign with "⌈ ⌉" expressed therein is 0, −1 is obtained by subtracting 1 from 0. Also, 9 is obtained by performing a modular arithmetic operation on −1 and 10 that is a value of $N_W$, and thus, 10 is obtained by summing 1 and 9. Accordingly, an index of a precoding matrix to be applied to a corresponding subcarrier is 10.

As another example, when downstream data is included in a subcarrier corresponding to an ID '0' and an ID of a current frame is 10, since a value of a sign "⌈ ⌉" with "$k/N_1P_{SC}$" expressed therein is 0 and a value of a sign "⌈ ⌉" with "m/NF" expressed therein is 1, 0 is obtained by subtracting 1 from the sum of the two values '0 and 1'. Also, 0 is obtained by performing a modular arithmetic operation on 0 and 10 that is a value of $N_W$, and thus, 1 is obtained by summing 1 and the result value. Accordingly, an index of a precoding matrix to be applied to a corresponding subcarrier is 1.

In this case, as in the above-described embodiment, the change period 'NF' of the precoding matrix may be determined with time correlation between spatial channels, or when supporting the HARQ scheme, the change period 'NF' of the precoding matrix may be an HARQ retransmission period.

Subsequently, the precoder 120 selects a precoding matrix, corresponding to an index of a precoding matrix calculated by the precoder 120, from the codebook stored in the memory 140 and applies the selected precoding matrix to a corresponding subcarrier, thereby precoding downstream data.

The transmitter 130 transmits the precoded downstream data to a terminal through a plurality of antennas 150.

The memory 140 stores a basic codebook including a plurality of precoding matrixes, and the basic codebook includes a plurality of codebooks (subset codebooks) generated by number of antennas. The precoder 120 determines a precoding matrix with the codebooks configuring the basic codebook.

Hereinafter, a precoding matrix determining method according to an embodiment of the present invention will be described in detail with reference to FIG. 4.

Figure 4:
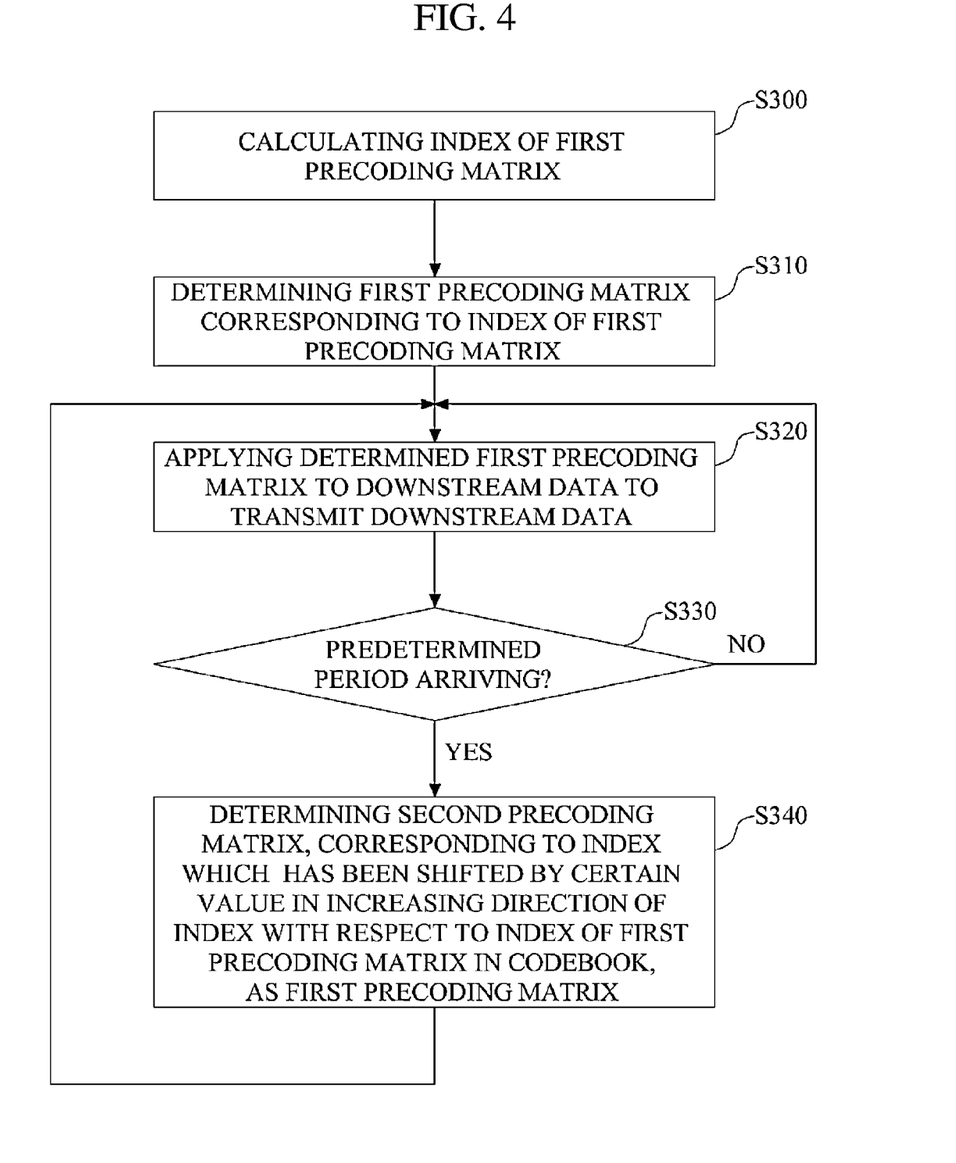
FIG. 4 is a flowchart illustrating a method for determining precoding matrix according to an embodiment of the present invention.

FIG. 4 is a flowchart illustrating a precoding matrix determining method according to an embodiment of the present invention. The precoding matrix determining method may be applied to a transmitting end (which supports the open-loop MIMO scheme) such as a base station.

Referring to FIG. 4, first, the precoding matrix determining apparatus calculates an index of a first precoding matrix to be applied to downstream data in operation S300. In an embodiment, the index of the first precoding matrix may be determined as a precoding matrix to be applied to a subcarrier including downstream data. In this case, as expressed in Equation (1), the precoding matrix to be applied to the subcarrier including downstream data may be determined as an ID of a corresponding subcarrier, the number of subcarriers that configure a subband including the corresponding subcarrier, and the number of precoding matrixes included in a codebook. Since a method of calculating the index of the first precoding matrix has been described above, its detailed description is omitted.

The precoding matrix determining apparatus determines a first precoding matrix, corresponding to the index of the first precoding matrix, from the codebook including a plurality of precoding matrixes in operation S310, and then applies the determined first precoding matrix to the downstream data to transmit the downstream data to a terminal in operation S320.

The precoding matrix determining apparatus determines whether a predetermined period arrives in operation S330, and when the predetermined period is arrived, the precoding matrix determining apparatus determines a second precoding matrix, corresponding to an index that has been shifted by a certain value in an increasing direction of an index with respect to the index of the first precoding matrix in the codebook, as the first precoding matrix in operation S340. For example, when a certain value for shift of an index is set as 1 and the index of the first precoding matrix is 1, the second precoding matrix may be determined as a precoding matrix corresponding an index '2', in the codebook.

In this way, the precoding matrix determining apparatus changing a precoding matrix, which will be applied to a subcarrier including downstream data per predetermined period, is for enhancing a diversity gain by allowing the downstream data to undergo another channel environment at the low-mobility communication environment.

Herein, the predetermined period may be determined with time correlation between spatial channels. Specifically, when the time correlation between the spatial channels is determined as high, this denotes the low-mobility communication environment, and thus, a short period may be set. When the time correlation between the spatial channels is determined as low, this denotes the high-mobility communication environment, and thus, a long period may be set. That is, a change period of a precoding matrix to be applied to downstream data may be set to be inversely proportional to the time correlation between the spatial channels.

In this case, the precoding matrix determining apparatus precalculates a predetermined period based on the time correlation between the spatial channels, and stores the calculated period in a table type. When the time correlation between the spatial channels has been calculated, a predetermined period matched with the time correlation between the spatial channels may be set as the change period of the precoding matrix to be applied to downstream, in a corresponding table.

In another embodiment, when a wireless communication system supports retransmission based on the HARQ scheme, the change period of a precoding matrix to be applied to downstream data may be an HARQ retransmission period, thereby enhancing an HARQ gain.

Subsequently, operations after operation S320 are performed repeatedly.

When the predetermined period does not arrive in operation S330, the precoding matrix determining apparatus applies the first precoding matrix, which has been determined in operation S310, to the downstream data and transmits the downstream data to the terminal.

Figure 5:
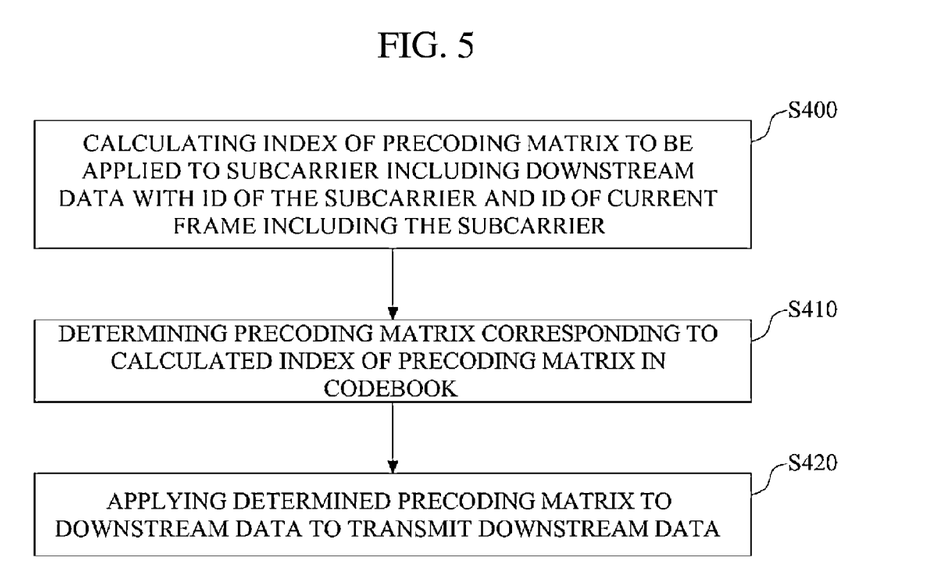
FIG. 5 is a flowchart illustrating a method for determining precoding matrix according to another embodiment of the present invention.

FIG. 5 is a flowchart illustrating a precoding matrix determining method according to another embodiment of the present invention. The precoding matrix determining method according to another embodiment of the present invention may be applied to a transmitting end (which supports the open-loop MIMO scheme) such as a base station, identically to the precoding matrix determining method of FIG. 4.

Referring to FIG. 5, first, the precoding matrix determining apparatus calculates an index of a precoding matrix to be applied to a subcarrier including downstream data, with an ID of the subcarrier and an ID of a current frame including the subcarrier in operation S400.

Specifically, as expressed in Equation (2), the precoding matrix determining apparatus calculates an index of a precoding matrix to be applied to the subcarrier including downstream data, by using an ID of the subcarrier, the number of subcarriers that configure a subband including the subcarrier, an ID of a current frame including the subcarrier, a change period of a precoding matrix, and the number of precoding matrixes included in a codebook.

That is, in the embodiment of FIG. 5, the precoding matrix determining apparatus may determine a precoding matrix to be applied to the subcarrier including downstream data in consideration of an ID of a current frame including the subcarrier and thus allow the precoding matrix, which will be applied to the corresponding subcarrier, to be changed per a predetermined period.

In this case, as in the embodiment of FIG. 4, the change period of a precoding matrix may be determined with the time correlation between the spatial channels, or the change period of a precoding matrix may be an HARQ retransmission period when supporting the HARQ scheme.

Since a method that calculates an index of a precoding matrix in operation S400 has been described above with reference to Equation (2), its detailed description is omitted.

Subsequently, the precoding matrix determining apparatus selects a precoding matrix, corresponding to the index of the precoding matrix that has been calculated in operation S400, from the codebook in operation S410, and applies the selected precoding matrix to the downstream data and transmits the downstream data to the terminal in operation S420.

The above-described precoding matrix determining method may be realized in a program command type executable in computers and stored in a computer-readable record medium. Herein, the computer-readable record medium may include a program command, a data file, and a data structure individually, or include the combination thereof. Furthermore, program commands stored in the record medium may be designed and constructed particularly for the present invention, or known to those skilled in computer software and usable.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method for determining precoding matrix based on an open-loop Multi-Input Multi-Out (MIMO) scheme, comprising:
    applying a first precoding matrix to downstream data to transmit the downstream data through a plurality of antennas, the first precoding matrix being selected from a codebook which comprises a plurality of precoding matrixes; and
    changing the first precoding matrix to a second precoding matrix per predetermined period, and applying the second precoding matrix to the downstream data to transmit the downstream data through the antennas,
    wherein the second precoding matrix is a precoding matrix corresponding to an index which has been shifted by a certain value from an index of the first precoding matrix in a direction where an index of a precoding matrix increases, in the codebook,
    wherein the first precoding matrix is determined with an identifier (ID) of a subcarrier which comprises the downstream data, the number of subcarriers which configure one subband comprising the downstream data, and the number of precoding matrixes comprised in the codebook,
    wherein the applying of a first precoding matrix comprises:
        performing a modular arithmetic operation on a result value, which is obtained by subtracting one from an integer value of a ratio of the ID of the subcarrier and the number of subcarriers configuring the subband, and the number of precoding matrixes comprised in the codebook; and
        determining a precoding matrix of which an index is a result value obtained by adding one to the modular arithmetic operation result value in the codebook as the first precoding matrix.

2. The method for determining precoding matrix of claim 1, wherein,
    the subband is configured with four resource blocks which are successive in a subcarrier axis direction, and
    the resource block is configured with eighteen subcarriers and six symbols.

3. The method for determining precoding matrix of claim 1, wherein the predetermined period is determined according to time correlation between a plurality of spatial channels.

4. The method for determining precoding matrix of claim 1, wherein when supporting retransmission based on a Hybrid Automatic ReQuest (HARQ) scheme, the predetermined period is an HARQ retransmission period.

5. The method for determining precoding matrix of claim 1, wherein the codebook is selected from a basic codebook which comprises a plurality of codebooks generated by number of the antennas.

6. A method for determining precoding matrix based on an open-loop Multi-Input Multi-Out (MIMO) scheme, comprising:
    calculating an index of a precoding matrix to be applied to a subcarrier, with an identifier (ID) of the subcarrier and an ID of a current frame including the subcarrier; and
    determining a precoding matrix corresponding to the calculated index as a precoding matrix to be applied to the subcarrier, in a codebook comprising a plurality of precoding matrixes,
    wherein the calculating of an index comprises:
        summing an integer value of a ratio of the ID of the subcarrier and the number of subcarriers comprised in one subband comprising the subcarrier and an integer value of a ratio of the ID of the current frame and a certain frame period, and subtracting one from the summed result value;
        performing a modular arithmetic operation on the subtracted result value and the number of precoding matrixes comprised in the codebook; and
        adding one to the modular arithmetic operation result value.

7. The method for determining precoding matrix of claim 6, wherein,
    the subband is configured with four resource blocks which are successive in a subcarrier axis direction, and
    the resource block is configured with eighteen subcarriers and six symbols.

8. The method for determining precoding matrix of claim 6, wherein the certain frame period is determined according to time correlation between a plurality of spatial channels.

9. The method for determining precoding matrix of claim 6, wherein when supporting retransmission based on a Hybrid Automatic ReQuest (HARQ) scheme, the frame period is an HARQ retransmission period.

10. A method for determining precoding matrix comprising:
selecting one precoding matrix from a codebook which comprises $N_w$ number of precoding matrixes defined as Nt×Mt, on the basis of an index 'K' of a subcarrier and an index 'M' of a frame; and
coding downstream data of the subcarrier using the selected precoding matrix to transmit the coded downstream data through a plurality of transmission antennas,
wherein Nt is the number of transmission antennas, and Mt is the number of transmission streams, wherein an index 'i' of the selected precoding matrix is determined as expressed in Equation below, $$i = \mathrm{mod}(\lceil k/(N_1 P_{sc}) \rceil + \lceil m/N_F \rceil - 1, N_w) + 1$$

where k denotes an ID of the subcarrier including the downstream data, and $N_1 P_{sc}$ denotes the number of subcarriers which configure a subband including a corresponding subcarrier, m denotes an ID of a current frame, $N_F$ denotes a change period of the precoding matrix to be applied to the corresponding subcarrier, and $N_w$ denotes the number of precoding matrixes included in the codebook.

11. A method for determining precoding matrix comprising:
selecting one precoding matrix from a codebook which comprises $N_w$ number of precoding matrixes defined as Nt×Mt, on the basis of an index 'K' of a subcarrier and an index 'M' of a frame;
coding downstream data of the subcarrier using the selected precoding matrix to transmit the coded downstream data through a plurality of transmission antennas;
changing the selected precoding matrix to another precoding matrix when the index of the frame is "M+$N_F$"; and
coding the downstream data of the subcarrier using the other precoding matrix to transmit the coded downstream data through the plurality of transmission antennas,
wherein Nt is the number of transmission antennas, and Mt is the number of transmission streams.

12. The method for determining precoding matrix of claim 11, wherein $N_F$ is determined according to the changing amount of channel based on time.

13. The method for determining precoding matrix of claim 11, wherein when applying a Hybrid Automatic ReQuest (HARQ) scheme, $N_F$ is determined according to an HARQ retransmission period.

14. The method for determining precoding matrix of claim 11, wherein,
the precoding matrixes are stored in the codebook in predetermined order, and
the other precoding matrix is a precoding matrix in a location to which the selected precoding matrix is cyclically shifted by a certain value from a currently stored location, in the codebook.

15. An apparatus for determining precoding matrix based on an open-loop Multi-Input Multi-Out (MIMO) scheme, comprising:
a precoder applying a first precoding matrix to downstream data and changing the first precoding matrix to a second precoding matrix to apply the second precoding matrix to the downstream data per predetermined period, the first precoding matrix being selected from a codebook which comprises a plurality of precoding matrixes; and
a transmitter transmitting precoded downstream data, outputted from the precoder, through a plurality of antennas,
wherein the second precoding matrix is a precoding matrix corresponding to an index which has been shifted by a certain value from an index of the first precoding matrix in a direction where an index of a precoding matrix increases, in the codebook,
wherein the precoder determines the first precoding matrix with an identifier (ID) of a subcarrier which comprises the downstream data, the number of subcarriers which configure one subband comprising the downstream data, and the number of precoding matrixes comprised in the codebook,
wherein the precoder performs a modular arithmetic operation on a result value, which is obtained by subtracting one from an integer value of a ratio of the ID of the subcarrier and the number of subcarriers configuring the subband, and the number of precoding matrixes comprised in the codebook, and determines a precoding matrix of which an index is a result value obtained by adding one to the modular arithmetic operation result value in the codebook as the first precoding matrix.

16. The apparatus for determining precoding matrix of claim 15, wherein
the precoder determines the first precoding matrix with an identifier (ID) of a subcarrier comprising the downstream data, the number of subcarriers which configure one subband comprising the downstream data, and the number of precoding matrixes comprised in the codebook.

17. The apparatus for determining precoding matrix of claim 15, wherein,
the subband is configured with four resource blocks which are successive in a subcarrier axis direction, and
the resource block is configured with eighteen subcarriers and six symbols.

18. The apparatus for determining precoding matrix of claim 15, wherein the precoder determines the predetermined period according to time correlation between a plurality of spatial channels.

19. The apparatus for determining precoding matrix of claim 15, wherein when supporting retransmission based on a Hybrid Automatic ReQuest (HARQ) scheme, the predetermined period is an HARQ retransmission period.

20. The apparatus for determining precoding matrix of claim 15, wherein
the precoder acquires the predetermined period from a table which stores a period and time correlation between a plurality of spatial channels, the stored period and time correlation being matched with each other.

21. An apparatus for determining precoding matrix based on an open-loop Multi-Input Multi-Out (MIMO) scheme, comprising:
a precoder calculating an index of a precoding matrix to be applied to a subcarrier with an identifier (ID) of the subcarrier and an ID of a current frame, and determining a precoding matrix, corresponding to the calculated index, in a codebook comprising a plurality of precoding matrixes to apply the determined precoding matrix to the subcarrier; and a transmitter transmitting a frame, comprising the subcarrier with the precoding matrix applied thereto, through a plurality of antennas, wherein the precoder sums an integer value of a ratio of the ID of the subcarrier and the number of subcarriers comprised in the subband comprising the subcarrier and an integer value of a ratio of the ID of the current frame and a certain frame period, subtracts one from the summed result value, performs a modular arithmetic operation on the subtracted result value and the number of precoding matrixes comprised in the codebook, and adds one to the modular arithmetic operation result value, thereby calculating the index of the precoding matrix.

22. The apparatus for determining precoding matrix of claim 21, wherein the precoder determines the frame period to be inversely proportional to time correlation between a plurality of spatial channels, or determines the frame period as a Hybrid Automatic ReQuest (HARQ) retransmission period when supporting retransmission based on an HARQ scheme.

* * * * *